United States Patent
Krivohlavek

(10) Patent No.: US 9,856,377 B1
(45) Date of Patent: Jan. 2, 2018

(54) MIX IN PLACE MIXING GRADE EMULSION FOR ASPHALT OR BITUMEN APPLICATIONS

(71) Applicant: Dennis D. Krivohlavek, Catoosa, OK (US)

(72) Inventor: Dennis D. Krivohlavek, Catoosa, OK (US)

(73) Assignee: Dennis D. Krivohlavek and Lucindy June Krivohlavek Revocable Family Trust, Catoosa, OK (US)

( * ) Notice: Subject to any disclaimer, the term of this patent is extended or adjusted under 35 U.S.C. 154(b) by 798 days.

(21) Appl. No.: 14/032,793

(22) Filed: Sep. 20, 2013

(51) Int. Cl.
    *C08L 95/00* (2006.01)
    *B01F 17/00* (2006.01)

(52) U.S. Cl.
    CPC ......... *C08L 95/005* (2013.01); *B01F 17/0064* (2013.01); *C08L 95/00* (2013.01)

(58) Field of Classification Search
    CPC ..... C08L 95/00; C08L 95/005; B01F 17/0064
    See application file for complete search history.

(56) References Cited

U.S. PATENT DOCUMENTS

| | | | |
|---|---|---|---|
| 2,412,526 A | 12/1946 | McCoy | |
| 2,620,312 A | 12/1952 | Manzer | |
| 2,773,777 A | 12/1956 | Surbiton et al. | |
| 4,008,096 A | 2/1977 | Knapp | |
| 4,302,326 A | 11/1981 | Bialek | |
| 4,721,529 A | 1/1988 | Mullins | |
| 5,137,572 A * | 8/1992 | Krivohlavek | B01F 17/0064 106/277 |
| 5,219,901 A | 6/1993 | Burke et al. | |
| 5,224,990 A | 7/1993 | Vicenzi et al. | |
| 5,256,195 A | 10/1993 | Redelius | |
| 5,273,683 A * | 12/1993 | Krivohlavek | B01F 17/0064 516/40 |
| 5,505,877 A * | 4/1996 | Krivohlavek | B01F 17/0007 149/118 |
| 5,618,340 A | 4/1997 | Krogh et al. | |
| 5,834,539 A * | 11/1998 | Krivohlavek | B01F 17/0007 149/118 |
| 6,027,634 A * | 2/2000 | Shirodkar | C10L 1/324 208/309 |
| 6,093,494 A | 7/2000 | Schulz et al. | |
| 6,786,962 B2 | 9/2004 | Yap et al. | |
| 6,793,726 B1 | 9/2004 | Yap et al. | |
| 6,840,991 B2 | 1/2005 | Honma et al. | |
| 6,855,754 B2 | 2/2005 | Takamura et al. | |
| 6,902,610 B2 * | 6/2005 | Guerin | C08L 95/00 106/277 |
| 7,097,703 B2 | 8/2006 | Boyer et al. | |
| 7,213,446 B2 | 5/2007 | Barnat | |
| 7,297,204 B2 | 11/2007 | Crews et al. | |
| 7,713,345 B2 | 5/2010 | Maldonado et al. | |
| 7,905,949 B2 * | 3/2011 | Crews | C08L 95/005 106/277 |
| 7,951,857 B2 | 5/2011 | Crews et al. | |
| 2006/0130704 A1 | 6/2006 | Partanen | |
| 2007/0082983 A1 * | 4/2007 | Crews | C04B 26/26 524/60 |
| 2009/0064898 A1 * | 3/2009 | Hurtado Aznar | C08K 5/19 106/246 |
| 2011/0243661 A1 * | 10/2011 | Baumgardner | E01C 7/24 404/72 |
| 2013/0195551 A1 * | 8/2013 | McDade | E01C 7/24 404/75 |

OTHER PUBLICATIONS

"Absorption of Asphalt Into Porous Aggregates" by Lee et al., http://onlinepubs.trb.org/onlinepubs/shrp/SHRP-90-009.pdf, Sep. 1990, Washington, D.C.

"Nanotechnology for Asphalt Modification" as presented by Geoffrey M. Rowe to the Association of Modified Asphalt Producers, AMAP 13th Annual Meeting, Feb. 7-9, 2012, Albuquerque, NM.

"Clay-Stabilized Asphalt Emulsions" by Dr. Alan James of AkzoNobel Surface Chemistry LLC. Alan James, Senior Scientist—Performance Applications, AkzoNobel 2010 Annual Meeting; Sunny Isles Beach, Florida; Thursday, Mar. 4, 2010 http://www.aema.org/2010+Annual+Meeting.

* cited by examiner

*Primary Examiner* — Michael A Salvitti
(74) *Attorney, Agent, or Firm* — Head, Johnson, Kachigian & Wilkinson, PC

(57) ABSTRACT

Asphaltic or bitumen emulsions designed for road construction applications. Construction of full depth pavements with emulsions and the related process disclosed herein is now possible at temperatures below about 160° F. to 180° F. by the unique and unexpected combination of emulsifier(s), surfactant(s) and optional break control agent(s), to form mixtures of emulsion plus break control agent and aggregates. The mixtures of emulsion plus break control agent and aggregates are then spread across the paving area. The spread mixture then breaks, sets and otherwise cures to a complete mass or mat suitable for the intended design application.

13 Claims, No Drawings

MIX IN PLACE MIXING GRADE EMULSION FOR ASPHALT OR BITUMEN APPLICATIONS

CROSS REFERENCE

Not Applicable

BACKGROUND OF THE INVENTION

Field of the Invention

The field of this invention is related to using asphaltic or bituminous materials to form emulsions to coat aggregates commonly used in the road construction industry for various paving applications. The aggregates of the invention do not meet gradations as used in various slurry seal or micro surfacing but rather as commonly used in hot mix or recycling (road or shingle, for example) applications. The emulsions may be either water-in-oil (also known as "Inverted") or oil-in-water type emulsions. The emulsions also utilize a "break control agent" ("BCA") to control break, set, cure and adhesion characteristics in application.

Description of the Related Art

There has long been a need to combine emulsions of asphaltic or bituminous materials with aggregates for construction purposes. Previous to the present invention herein such emulsions have suffered various deficiencies. A few non-limiting examples of these deficiencies are slow breaking characteristics, limited size of aggregate, susceptibility of the emulsion to wash off due to slow break or set, slow cure and poor strength of the resulting cured emulsion plus aggregate mixture and so on.

Prior to the present invention, such emulsions could not suitably overcome the above deficiencies when used for construction purposes. In their place and common today, hot asphalt or bitumen is mixed with hot aggregates and said "hot mix" materials transported while hot to construction sites for application. Due to the increased cost of energy and in order to offer savings to the construction industry, a technology known as "warm mix" has developed. While this warm mix is not mixed, asphalt/bitumen plus aggregates, at as high a temperature as hot mix, neither is below about 160° F. to 180° F. but rather above these temperatures for any or all the various components. It would be desirable to provide, in terms of energy expenditure, emulsions of asphalt or bitumen mixed with aggregates at temperatures below about the present 160° F. to 180° F. temperatures.

Prior art has also taught that emulsions can be successfully used at ambient temperatures when the aggregate is of a specific size and gradation. Such products are commonly known as either slurry seal (which generally does not use a break control agent) or micro surfacing (which generally does use a break control agent) products. The aggregate gradation specifications are issued by the International Slurry Seal Association and included herein by reference. While these emulsions for slurry seal and micro surfacing applications perform and are successfully used in construction of roads, they are not suited for applications wherein the aggregate gradation is outside those specified by the International Slurry Seal Association.

McCoy, U.S. Pat. No. 2,412,526, cures an emulsion utilizing various chromate chemicals at 200° F. until constant weight. McCoy then teaches away from the current invention in that conditions are not at ambient temperatures for break, set, cure and adhesion of an emulsion to aggregates.

Manzer, U.S. Pat. No. 2,620,312, teaches that water containing various metal salts such as sodium dichromate and ammonium sulfate may be combined with fuel oils to make a water-in-oil emulsion that is then blended with an asphalt or bituminous emulsion made with clay and sodium hydroxide. These combined emulsions are said to have good adhesion to aggregate when mixed according to the given procedure. The given procedure states the combined emulsions are mixed with 300° F. aggregate and cured in 140° F. oven for 48 hours before any form of adhesion test is performed. This teaches away from ambient temperature mixtures of emulsion, a separate break control agent and aggregate to create desirable break, set, cure and adhesion of an emulsion to said aggregates.

Surbiton et al., U.S. Pat. No. 2,773,777, teaches that asphalt or coal tar emulsions may have Portland cement and various acids like phosphoric acid and water soluble salts incorporated in a mixture containing aggregates to form slurries suitable for paving applications for improved fuel and solvent resistance. The art does not teach the use of a break control agent.

Knapp, U.S. Pat. No. 4,008,096, teaches that water soluble epoxide/oxides of, preferably, propylene, can react with sodium chloride or other salts to shift the pH of a cationic bituminous emulsion to thereby break the emulsion in a controlled manner. This is applied to plugging subterranean earth formations and not construction applications. Knapp does not address issues related to aggregate coating and the like as necessary in construction applications.

Mullins, U.S. Pat. No. 4,721,529, teaches application of divalent or trivalent metal salts derived via inorganic acid.

Burke et al., U.S. Pat. No. 5,219,901, teaches aggregate pre-coated with water insoluble high molecular weight organic polymer latex aqueous emulsion that is dried and thereby made suitable for hot mix application. In the hot mix application, the pre-coated aggregate is mixed with hot, free-flowing asphalt to produce the useful (road, roof, other) composition. Suitable aqueous emulsions of water insoluble high molecular weight polymers are: acrylic and methacrylic polymers and copolymers, styrene copolymers, 1,3-diene copolymers, acrylonitrile copolymers, vinyl acetate copolymers and other similar type polymers. The art teaches utility in hot mix applications, not those of an emulsion or utility of a break control agent.

Vicenzi et al., U.S. Pat. No. 5,224,990, teaches that clay emulsions, wherein the amines are mineral or organic acid reacted then added to the clay emulsion to stabilize said clay emulsion viscosity over time. Vicenzi et al. teaches away from the present invention in that clay emulsions are viscosity stabilized with no particular application to construction applications by use of a break control agent.

Redelius in U.S. Pat. No. 5,256,195, teaches use of a break control agent soluble in water and dispersed in an oil continuous phase to make a water-in-oil break control agent. This break control agent is then mixed with or into either a cationic or anionic bituminous emulsion. This product is said to be useful as a binder in road building, maintenance or construction work. The present invention teaches away from using water-in-oil break control agents and toward break control agents made water soluble by use of water insoluble or water dispersible organic acids and bases in combination with mineral or organic acids or bases.

Applicant's prior patents, U.S. Pat. Nos. 5,505,877 and 5,834,539, also teach the use of water-in-oil and oil-in-water emulsions for both burner fuel and construction applications. U.S. Pat. No. 5,834,539 column 17, line 45 and column 18, lines 20 through 23 as well as Claim 1 discuss formation of these "multiple phase" emulsions for construction applications. Applicant's prior patents also utilize various polymers, such as styrene butadiene polymers, in forming emulsions. However, neither of these patents teaches utilizing break control agents to create useful construction application products as taught herein.

Krogh et al., U.S. Pat. No. 5,618,340, teaches improved asphalt roof-coating compositions which include asphalt, clay and ether amine-acid complex surfactant. This teaching incorporated solvents. This art does not teach the use of break control agents nor construction applications utilizing aggregates.

Schulz, et al., U.S. Pat. No. 6,093,494, teaches art of pre-coating and drying latex, styrene butadiene latex in particular, plus water soluble divalent salt for material stability and heated (66° F. to 232° F.) in the presence of aggregate to pre-coat the aggregate and cross-link the polymer of the latex to the aggregate. Poly-ethylene glycol and magnesium sulfate are also suitable to stabilize the latex. This art teaches hot mix applications with no emulsification of the asphalt discussed.

Yap et al., U.S. Pat. No. 6,786,962, uses bitumen and solvent (a cutback) in combination with water/clay slurry to make an emulsion. Adding fibers and fillers to the cutback that is then made into the emulsion optimizes art taught by Yap et al. While Yap et al. teaches the art of using clay and fibers in emulsions and mastics, there is no art taught related to construction applications utilizing break control agents and aggregates.

Yep et al., U.S. Pat. No. 6,793,726, deals with cut back or solvent containing emulsions for drilling applications. These emulsions use clay and water to form emulsions. While teaching the art of clay bituminous emulsions, there is no application toward use of said emulsions in construction applications. Nor is there taught the use of break control agents for any reason.

Honma et al., U.S. Pat. No. 6,840,991, teaches slurry seal made with craft lignin of molecular weight ranging from 4,000 to 6,000,000 with specific polyamine to control mix time with slurry seal aggregates. Emulsion can contain tannins for adhesion promotion and water soluble polymers such as polyvinyl alcohol and other adjuvants to control emulsion stability. Phosphoric and other acids may be used in combination with polyamines. This art teaches slurry seal technology wherein no break control agent is used. The art does not teach any utility with any type of aggregates graded to meet hot mix criterion.

Takamura et al., U.S. Pat. No. 6,855,754, teaches that aggregates conforming to International Slurry Seal Association (ISSA) gradation classifications will benefit from emulsions wherein various metal salts are used in combination with cement as a break modifier, also known as a break control agent. Takamura et al. teaches away from art of the current invention wherein ISSA gradation classification aggregates are not suitable.

Other examples of known art attempt to minimize the use of solvents or petroleum distillates. One such example is Guerin et al., U.S. Pat. No. 6,902,610, wherein water-in-oil emulsions are to largely replace solvents in the formula. This work teaches the use of mineral acids or bases with organic bases or acids, respectively, and pH adjustments to achieve water-in-oil emulsions. These water-in-oil emulsions are then blended with oil-in-water emulsions to make the final mixing grade emulsion. Guerin et al. teaches away from the present invention as there is no mention of pre-coating agents, chemicals or break control agents and the like.

Boyer et al., U.S. Pat. No. 7,097,703, discusses clay as an additive or filler. The emulsifiers are amines and/or polyvinyl alcohols. The art teaches that coal, tar, asphalt, solvents and additives in combination with anti-wear agents of carboxylic acids with aliphatic polyamides yield anti-strip agents to improve wear in pavement sealers. There is no discussion of break control agents or road construction applications.

Barnat, U.S. Pat. No. 7,213,446, teaches that combinations of amines reacted with carboxylic acid to form a carboxylate will, when emulsified, create an emulsion for road construction dressings (a chip seal) based on said emulsions coalescence properties. The art taught by Barnat does not utilize a break control agent as taught in the present invention.

Maldonado, et al., U.S. Pat. No. 7,713,345, teaches a warm mix asphalt paving composition containing an asphalt modified binder and aggregate wherein at least one part of the modification is a hydrated phosphate modifier. This art is related to warm mix application, not emulsions.

Crews et al., U.S. Pat. No. 7,905,949, teaches that solvent emulsions can be successfully used to make roads of similar performance to hot mix applications by design of the emulsification chemicals. There is no provision for controlling the break, set or cure by means of a break control agent. There is no art taught therein utilizing clay or phosphate esters as the primary emulsifier. The present invention taught herein utilizes clay and phosphate esters as primary emulsifiers and a break control agent.

There have therefore been various attempts to make emulsions of asphalt/bitumen mix with aggregates for construction applications. An example is found in Crews et al., U.S. Pat. Nos. 7,297,204 and 7,951,857, wherein a water-in-oil bituminous dispersion (the water-in-oil, a so called "inverted" dispersion) and aggregate are combined to create a bituminous composition of the two ingredients. Temperature ranges of the water-in-oil (w/o emulsion) bituminous dispersion are from about 75° C. to 95° C. while the aggregate components range from about 75° C. to 95° C. and about 60° C. to 140° C., respectively. The final composition of the two components has a temperature range of from about 50° C. to 120° C. This is an example of current art known as "warm mix" technology. But, such art does not encompass the present invention as temperature ranges above ambient are required. The art taught by Crews et al. is further limited away from art taught herein by a minimum use of 75% asphalt or bitumen by total weight of dispersion. Another difference between Crews and the present invention is the use of pre-coating agents, oils, solvents, asphalt/bitumen or break control agents.

Partanen, U.S. Patent Application Publication No. U.S. 2006/0130704, teaches that clay-in-water solutions containing aluminum chloride and ferric chloride may be successfully used to form emulsifying agents for synthetic and/or petroleum asphalt emulsions. These emulsions may be modified with oils or reclaimed motor oils and fluxes along with ground and/or recycled tire rubber. The present invention teaches the application temperatures to be at or above ambient or room temperature. There is no teaching of compositions suitable for quick breaking, setting and curing to form suitable asphalt pavements with typical hot mix aggregate gradations. Rather, the art directs itself toward slurry seal applications. There is no art taught utilizing a break control agent.

Such art as previously disclosed still falls short of desirable application in practice.

SUMMARY OF THE INVENTION

The objective of this invention is using asphaltic or bituminous emulsions and a break control agent (the "BCA") at ambient or slightly above (to a maximum of about 160° F. to 180° F.) to coat aggregates or recycling materials that surprisingly not only mix and coat but also break, set and cure on the aggregates such that the residual asphaltic or bituminous materials do not immediately wash off with water.

Embodied herein are examples of the various chemical constituents useful to create the desired emulsion mixing time, break, set, cure and adhesion which, unexpectedly, create an asphalt or bituminous coating over the aggregate or a surface not easily washed off with water. Said asphalt or bitumen may be modified in any number of ways known in the art of asphalt or bituminous modifications.

Further embodiments are the mixture of asphalt or bitumen (modified or not) emulsion plus BCA plus aggregate, which may itself be further modified by known hot or cold (temperatures at or from about ambient to about a non-limiting maximum of about 160° F. to 180° F. range) mix additives. Hot or cold mix additives having previously been limited due to temperature or other constraints, physical or chemical in nature, are now unexpectedly relieved of these limitations by the use of the invention disclosed herein.

The invention herein described allows a formulator to create a product that is both convenient, by being at ambient temperatures, and useful for various construction applications and, in particular, road construction applications.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention is created for making mixtures of aggregates, and/or recyclable materials or oils, and asphaltic or bituminous containing oil binders for road construction applications.

In a preferred embodiment, the break control agent is composed of a chemical moiety known as tall oil amido amine plus hydrochloric acid plus a de-foaming or surface wetting agent mixed in water. Tall oil amido amine denotes typical or classic reaction of tall oil, which contains 20% to 40% by weight tall oil rosins by weight with the balance tall oil fatty acids (including optional dimmer/trimmer moieties), reacted with various amine moieties to make the tall oil amido amine product.

In another embodiment, a break control agent (the "BCA") is composed of fatty acids or tall oil fatty acids plus sodium hydroxide mixed in water. This BCA may or may not contain de-foaming or surface wetting agents or other performance promoting moieties.

In a preferred embodiment, an emulsion is made by using phosphorlated moieties of fatty acids, various fatty amines, fatty alcohols, nonyl phenol, octyl phenol or other like or similar chemical moieties, or combinations thereof, that have oxides of ethylene, propylene or the like reacted to form what is commonly known as phosphate surfactants. The oxide portion of the molecule may be varied in the amount of composition in the molecule. By example, a preferred embodiment is composed of 20-moles of ethylene oxide phosphate ester of nonyl phenol and combined with a second nonyl phenol phosphate ester having 12-moles of ethylene oxide in the ratio of about 60% the former with 40% the latter by weight. To this combination of nonyl phenol ethylene oxide phosphate esters is added about 0.02% of a de-foaming surface wetting agent known as DC-200 that is 200-centipoise in viscosity.

Controlling the break of an emulsion with a break control agent has been developed for various asphalt applications. Controlled break of the clay emulsion as set forth in Knapp, U.S. Pat. No. 4,008,096, wherein an asphalt emulsion made with various quaternary amine chemicals is broken by delayed reaction of various epoxides, metal salts, ureas and the like, is an example. Until the unexpected findings disclosed herein, no such controlled break has been taught for construction applications.

In another preferred embodiment of the invention disclosed herein, the emulsion is made by use of clay. Many types of clay, bentonite and other clays ground to various gradations, are within the purview of this invention. However, clay known as sepiolite has been found preferable for this new invention. More specifically, sepiolite from IMV Nevada and sold under the trade name Thermogel® has been found particularly useful. Sepiolite clay, as taught herein, may be used to form both water-in-oil (w/o or Inverted) and oil-in-water (o/w) emulsions that have utility in the art taught herein. The respective w/o or o/w emulsions may be formed by adjustment of the water to asphalt (or oil) ratio with respect to the amount of sepiolite (or other clay types) as is known in the art. What is surprising is when either emulsion is combined with a break control agent, the mixing time, break, set, cure and adhesion may be controlled. Such control of these parameters thereby creates an unexpectedly useful product for construction applications.

In a preferred embodiment, the break control agent may be of either a cationic (having a soap formed by mineral acids with organic base moieties) or anionic (having a soap formed by mineral bases with organic acid moieties) in character in an aqueous solution or soap. The BCA may further have adjunct additives or chemical moieties in the formulation to aid in creating the final useful construction products. Non-limiting chemical moieties found useful are: organic acids such as molecules containing nitrogen, organic bases as various carboxylic acid moieties, mineral bases typical of those known as metal hydroxides and common mineral acids such as, but not limited to, hydrochloric, nitric, sulfuric and the like. More specifically, a preferred embodiment is the organic acid being a tall oil fatty acid and rosin mixture while the organic base is a fatty acid tall oil amido amine containing various rosin concentrations. Adjunct additives may be any number of water soluble chemical moieties such as, but not limited to, organic or inorganic thickening agents (polyvinyl alcohols, cellulosic, gums and the like) or wetting agents or de-foaming agents that may or may not be organic or inorganic in chemical nature or combinations of like or similar moieties. The preferred non-limiting adjunct additive is a silicone de-foaming and wetting agent. There are several non-limiting examples of silicone de-foaming and wetting agents. Some of these silicone agents are also known to impart adhesiveness as well as wetting and de-foaming properties. Silicone and/or siloxane exhibit a wide variety of useful purposes in asphalt or bitumen technology. One example in the literature, wherein the utility of silicone moieties is described, is in the document "Absorption of Asphalt Into Porous Aggregates" by Lee et al., published by Strategic Highway Research Program, National Research Council, Washington, D.C., SHRP-A/UIR-90-009, CONTRACT A-003B, September 1990, p. 20, now included herein by reference. In Lee et al., the control of asphalt absorption is discussed. A non-limiting example of a family of non-limiting examples of silicone chemical moieties is known under the company name of Zydex Industries, such as their Zydex® NanoTac or Zyco-Therm™ or ZycoSoil™, wherein similar chemical moieties may exist under other company brand names and now included herein by reference. In the Zydex Industries family of silicone moieties, various attributes, such as the non-limiting example of adhesion enhancements, are discussed. Non-limiting example(s) teaching known art specific to Zydex silicone chemical moieties are discussed in the paper "Nanotechnology for asphalt modification" by Dr. Geoffrey M. Rowe, as presented to the Association of Modified Asphalt Producers, AMAP 13$^{th}$ Annual Meeting, Feb. 7-9, 2012. This paper may be found under the title "3-6-Nanotechnology-for-asphalt-modification" at the AMAP web site "modifiedasphalt.org" which is included herein by reference. An additional non-limiting example of another company providing siloxane and non-siloxane (that is to say organic) de-foamers and de-aerators is Air Products, now included herein by reference. Another non-limiting example of a company offering many different types of silicone and non-silicone products is Wacker, which is now included herein by reference. One preferred non-limiting additive is known as DC-200 as made by the Dow Chemical Company. The preferred BCA embodiment may include, but not be limited to, any of these chemical moiety adjuvants depending upon the emulsion formed with the asphalt or bitumen and their collective interaction with the aggregates as taught herein.

The water based chemical solutions for the BCA may be made by any suitable means commonly known for this application.

The emulsions of asphalt or bitumen and emulsifiers or surfactants may be made by any suitable means known to and commonly used in industry to form such products.

Suitable preferred aggregates are any aggregates defined by gradation as are common in use for hot mix applications and not having a gradation for use in slurry seal applications. These aggregates and their gradation may themselves be modified by the addition of various materials to improve their performance. Non-limiting examples of aggregate modification are fibers made from various sources, ground tire or ground shingles or other components.

Suitable asphalt or bitumen or oil may be any asphalt or bitumen suitable for construction purposes. Such asphalts or bitumen deemed suitable are, but not limited to, natural or refined, modified or neat. There are many such modifications known to those skilled in the art. Non-limiting examples are asphalt or bitumen modified with various polymers, anti-strip additives, acids or bases.

Suitable construction product taught by the present invention is composed of the emulsion of the invention mixed with aggregate (including optional aggregate/gradation modifications) which has been pre-mixed with a break control agent of the invention and optionally water to aid in mixing of the components. This mixture of emulsion, aggregate, break control agent and related optional components is then placed in application by suitable means as is known to the industry.

The following non-limiting examples and descriptions are to further illustrate the practical utility of this new and unexpected art.

Example No. 1—Basic Application of the New Art Taught Herein

An oil-in-water emulsion was made by suitable means as follows:
  68.00% Emulsion Base Asphalt or Bitumen at about 275° to 280° F. added to 1.00% Phosphated 20-mole Ethylene Oxide Nonyl Phenol mixed in 95° to 120° F. water pH=as is =1.16
  Water to balance of 100 weight percent of formula
  The above emulsion was mixed with the following limestone single size aggregate having from about ⅜-inch to ¾-inch maximum size. To the mix was added cellulosic fibers known as CF 31500C (now CF 315 SMA) from Fiberized Products, Ohio, at more than two times typical usage for hot mix being at about 12-lbs versus about 5-lbs per ton as in UNHSC Design Specifications for Porous Asphalt Pavement and Infiltration Rev. October 2009 and now included herein by reference, respectively.
  Also added to the mix of emulsion of Example No. 1 and limestone aggregate and CF 31500C was tap water as a mixing aid and a break control agent of the invention to complete all ingredients for the mix.
  The BCA contained, by total weight percent its composition, the following:
  96.15% Water, potable tap water
  3.00% Corsabond 124—Cationic Rapid Set Di-Amine emulsifier, Corsicana Technologies
    Now included herein by reference
  0.85% Hydrochloric Acid (HCl), 20° Be
    to pH=2.04
  Composition of Mix with Aggregate of Experiment No. 1—
  100.0-grams Limestone Aggregate at ambient temperature unless otherwise noted
  1.0-grams Water as mixing aid
  0.6-grams CF 31500C Fibers
  7.0-grams Emulsion of Example No. 1
  The Mixing Procedure—to a round friction top quart can and at ambient temperature, except as noted, add the following:
    1) Aggregate
    2) Fibers
    3) Water
    4) Mix by hand with spatula to coat aggregate and fibers with water
    5) BCA and mix with spatula to uniformly coat and distribute throughout
    6) 140° F.-145° F. Emulsion noting time "Zero", spatula mix by hand for five (5) minutes
    7) Record:
      1) Time to Coat contents of mix
      2) % Coating at end of 5-minute mix period
      3) Time to Set by Adhesion to spatula
      4) Wash Off % or "Cure" of emulsion ("Zero %"=No Wash Off) from/to aggregate
      5) Comments/Observations (C/O)

From this Mixing Procedure the following Mix Procedure Data was observed and recorded:
1) Time to Coat=about 1-minute
2) % Coating=100%
3) Time to Set=about 10-minutes
4) Wash Off %=0% at Time to Set
5) C/O=none A second BCA, designated BCA No. 2, was made to be tested with the above emulsion and aggregate mixture without the fibers but including a silicone de-foaming and wetting agent or chemical commercially known as DC-200 from Dow Corning (also known as XIAMETER) which is now included herein by reference. This composition of the second BCA was:
  100.0-grams Water, potable tap water
  3.0-grams Corsabond 124
  2.5-grams HCl, 20° Be
  0.1-grams DC-200 Commercial Silicone De-foam Wetting Agent from Dow (XIAMETER)

Composition of Mix with Aggregate of Experiment No. 1—BCA No. 2
  100.0-grams Aggregate
  1.0-grams Water
  1.5-grams Second BCA (BCA No. 2) composition as noted above The same Mix Procedure as for the first BCA mix was followed yielding the following Mix Procedure Data results:
1) Time to Coat=about 30-seconds
2) % Coating=100%
3) Time to Set=about 8-minutes
4) Wash Off %=0% at Time to Set
5) C/O=none Example No. 2—Anionic Emulsion Made with 12-Mole EO Phosphated Emulsifier A second oil-in-water emulsion was made to illustrate the utility of phosphated emulsifiers or surfactants of the art taught herein for formation of anionic emulsions. Previous art as taught by Applicant in U.S. Pat. No. 5,137,572, now included herein by reference, teaches that emulsifiers composed of oxides and phosphates may make either anionic or cationic emulsions of asphalt or bitumen for mixing grade applications. Taught in U.S. Pat. No. 5,137,572 is that, in general, the oxide portion should be about 50-moles or greater. Also taught in U.S. Pat. No. 5,137,572 is that mineral acids or bases may be employed to create these various emulsion types.

Experiment No. 2—Composition of Emulsion:
  68.00% AC-20 Base Asphalt or Bitumen: NOTE—Similar to PG64-22 graded product
  1.00% Phosphated 12-mole Ethylene Oxide Nonyl Phenol
  0.62% Sodium Hydroxide, NaOH @50% by weight
  pH=as is=11.19
  Water to balance of 100 weight percent of formula
  Notes: Emulsion formed easily by use of the same suitable commonly known means and temperatures of forming an asphalt or bituminous emulsion as in Experiment No. 1 above.

By the formation of the emulsions of Experiment No. 1 and Experiment No. 2 above, it is now taught herein the utility of making cationic and/or anionic emulsions by use of 20-mole and 12-mole ethylene oxide phosphated nonylphenol emulsifier/surfactants, respectively, for use with break control agents. By the illustrative mixes of the new art emulsions and break control agents it is now taught that such mixes can combine in order to form suitable surprisingly desirable products for the construction industry.

Example No. 3—Combined 20-Mole and 12-Mole EO Phosphated Nonyl Phenol

In a third emulsion of the oil-in-water type, the two previous emulsifiers were combined and mixed with the same aggregate as those in Experiment Nos. 1 and 2. The same temperatures and methods of emulsion formation as in Experiment No.'s 1 and 2 were employed.

Experiment No. 3—Composition of Emulsion:
  68.00% Asphalt or Bitumen, same as in Experiment No. 2 at 275° F. to 280° F. added to 1.00% Phosphated Nonyl Phenol mixed in 95° F. to 120° F. water
  50.00% 20-mole EO of Experiment No. 1
  50.00% 12-mole EO of Experiment No. 2
  pH=as is =2.29
  Water to balance of 100 weight percent of formula The following break control agents were made and mixed with the aggregate and experimental methods and temperatures outlined in Experiment No. 1 above. These break control agents were mixed with the emulsion of Experiment No. 3 above.

BCA No. 6—Composition to 100% weight percent
  3.00% Corsamul 500—Commercial emulsifier from Corsicana Technologies, TX
  4.90% HCl, 20° Be
  0.30% DC-200
  pH=1.5
  Water to balance formula to 100% by weight Composition of Mix with Aggregate of Experiment No. 1—BCA No. 6
  100.0-grams Aggregate of Experiment No. 1
  1.5-grams BCA No. 6
  7.0-grams Emulsion of Experiment No. 3

From the above Composition of Mix with Aggregate of Experiment No. 1, the following Mix Procedure Data with BCA No. 6 was obtained:
1) Time to Coat=about 30-seconds
2) % Coating=100%
3) Time to Set=about 1-hour
4) Wash Off %=0% at Time to Set
5) C/O=none The Emulsion of Experiment No. 3 was further tested with a different BCA, BCA No. 7, to illustrate the diversity of break control agents that are useful in the invention.

BCA No. 7—Composition to 100% weight percent
  3.00% Corsabond 124—Commercial emulsifier from Corsicana Technologies, TX
  2.50% HCl, 20° Be
  1.00% DC-200
  pH=2.0
  Water to balance formula to 100% by weight Composition of Mix with Aggregate of Experiment No. 1—BCA No. 7
  100.0-grams Aggregate of Experiment No. 1
  0.5-grams Water as mixing aid
  2.0-grams BCA No. 7
  7.0-grams Emulsion of Experiment No. 3

From the above Composition of Mix with Aggregate of Experiment No. 1, the following Mix Procedure Data for BCA No. 7 was obtained:

1) Time to Coat=about 45-seconds
2) % Coating=100%/0
3) Time to Set=about 15 minutes
4) Wash Off %=about 20-minutes
5) C/O=none The Emulsion of Experiment No. 3 was again tested with a different BCA, BCA No. 8, to illustrate the utility of tall oil based amido amines and their application to break control agents that are useful in the invention.

BCA No. 8—Composition to 100% weight percent
3.00% Amido Amine of Crude Tall Oil Base JLB 464 from Corsicana Technologies
2.00% HCl, 20° Be
0.50% DC-200
pH=2.0
Water to balance formula to 100% by weight
Composition of Mix with Aggregate of Experiment No. 1—BCA No. 8
100.0-grams Aggregate of Experiment No. 1
2.0-grams BCA No. 8
7.0-grams Emulsion of Experiment No. 3
From the above Composition of Mix with Aggregate of Experiment No. 1, the following Mix Procedure Data with BCA No. 8 was obtained:
1) Time to Coat=about 30-seconds
2) % Coating=100%
3) Time to Set=about 8-minutes
4) Wash Off %=about 10-minutes
5) C/O=none Example No 4—Example of Preferred Embodiment In this experiment, which is exemplary of the preferred embodiment, combines a portion of a non-limiting wetting agent with 20-mole ethylene oxide and 12-mole ethylene oxide phosphated nonyl phenol emulsifiers as of Experiment No. 3 and pre-combined with the BCA as given in BCA No. 10 to yield a surprisingly fast breaking and setting emulsion of the new art taught herein.

Experiment No. 4—Composition of Emulsion:
68.00% Asphalt or Bitumen, same as in Experiment No. 2 at 275° F. to 280° F. added to 1.00% Phosphated Nonyl Phenol mixed in 95° F. to 120° F. water
49.990% 20-mole EO of Experiment No. 1
49.990% 12-mole EO of Experiment No. 2
0.020% DC-200 De-Foam and Wetting Agent
pH=as is =2.35
Water to balance of 100 weight percent of formula
BCA No. 10—Utility of Pre-Blending De-Foaming and Wetting moieties in BCA
3.00% BCA Surfactant Blend to 100% by weight:
95.00% Potable Tap Water
3.00% BCA No. 10 Chemical Blend:
99.00% Amido Amine of Crude Tall Oil Base JLB 464
1.00% DC-200
2.00% HCl, 20° Be
pH=2.0
Water to balance formula to 100% by weight
Composition of Mix with Aggregate of Experiment No. 1—BCA No. 10
100.0-grams Aggregate of Experiment No. 1
1.0-grams BCA No. 10 Surfactant Blend
7.0-grams Emulsion of Experiment No. 4
From the above Composition of Mix with Aggregate of Experiment No. 1, the following Mix Procedure Data with BCA No. 10 was obtained:

1) Time to Coat=about 20-seconds
2) % Coating=100%
3) Time to Set=about 6-minutes with Adhesion
4) Wash Off %=0% at Time to Set
5) C/O=none Example No. 5—Preferred Embodiment with Alternate Supplier of Emulsifier There are many suppliers of surfactants or potential suppliers of nonyl phenol surfactants utilizing various amounts of oxides such as ethylene oxide. These same chemical manufacturers and/or suppliers may also be able to add phosphates to the molecule. Therefore, in order to demonstrate the potential supply variations, another manufacturer/supplier of ethylene oxide phosphate esters of nonyl phenol was utilized in this Experiment No. 5. These ethylene oxide phosphate esters of nonyl phenol are known under the trade name T-Muls® as marketed by Harcros Chemical, Kansas City, Mo. The 20-mole and 12-mole moieties of the T-Muls line are known in the industry as T-Muls® N20P and T-Muls® 734-2, respectively. While the ratio of the two respective ethylene oxide phosphate esters of nonyl phenol was adjusted to create a desirable product, this serves to teach that various manufacturers or suppliers may adjust such ratios in order to satisfy the purview of the new art taught herein.

Experiment No. 5—Composition of Emulsion:
68.00% Asphalt or Bitumen, same as in Experiment No. 2 at 325° F. to 330° F. added to 1.00% Phosphated Nonyl Phenol+DC-200 mixed in 75° F. to 80° F. water
59.998% 20-mole EO Phosphate Ester of Nonyl Phenol of Alternate Supply
39.992% 12-mole EO Phosphate Ester of Nonyl Phenol of Alternate Supply
0.020% DC-200 De-Foam and Wetting Agent
pH=as is =2.18
Water to balance of 100 weight percent of formula
The above emulsion was used with the break control agent, BCA No. 9, whose formula is given below. This is then followed by a mix with aggregate. The results follow.
BCA No. 9—Amido Amine with De-Foam or Wetting Chemical
3.00% Amido Amine of Crude Tall Oil Base. JLB 464 from Corsicana Technologies
2.50% HCl, 20° Be
0.20% DC 200
pH=2.0
Water to balance formula to 100% by weight
Composition of Mix with Aggregate of Experiment No. 1—BCA No. 9
100.0-grams Aggregate of Experiment No. 1
1.0-grams BCA No. 9
7.0-grams Emulsion of Experiment No. 5
From the above Composition of Mix with Aggregate of Experiment No. 1, the following Mix Procedure Data with BCA No. 9 was obtained:
1) Time to Coat=about 20-seconds
2) % Coating=100%/0
3) Time to Set=about 2-minutes with Adhesion
4) Wash Off %=0% at about 7-minutes with Adhesion
5) C/O=

The above mix with aggregate illustrates the ability of the surprising and unexpected new art taught herein to create an emulsion system that is very fast to break, set with adhesion and cure.

Example No. 6—Preferred Embodiment with Emulsifier+Wetting Agent Pre-Blended

This is another example of the preferred art. In this example the ratio of the T-Muls® emulsifiers was slightly adjusted from the ratio given in Example No. 5 for convenience and again pre-blended with the wetting agent. The resulting emulsion was tested with various break control agents to illustrate the versatility and utility of the new art taught herein.

Experiment No. 6—Composition of Emulsion:
68.00% Asphalt or Bitumen, same as in Experiment No. 2 at 325° F. to 330° F. added to 1.00% Phosphated Nonyl Phenol+DC-200 mixed in 75° F. to 80° F. water
59.988% 20-mole EO Phosphate Ester of Nonyl Phenol of Alternate Supply
39.992% 12-mole EO Phosphate Ester of Nonyl Phenol of Alternate Supply
0.020% DC-200 De-Foam and Wetting Agent
pH=as is =2.19
Water to balance of 100 weight percent of formula
BCA No. 10—Utility of BCA with Various Emulsifier Suppliers—Re-blend of BCA No. 10 in Experiment No. 4
3.00% BCA Surfactant Blend to 100% by weight:
 95.00% Potable Tap Water
 3.00% BCA No. 10 Chemical Blend:
  99.00% Amido Amine of Crude Tall Oil Base JLB 464
  1.00% DC-200
 2.00% HCl, 20° Be
 pH=2.0
 Water to balance formula to 100% by weight
Composition of Mix with Aggregate of Experiment No. 1—BCA No. 10
100.0-grams Aggregate of Experiment No. 1 at ambient temperature
 1.0-grams BCA No. 10 Surfactant Blend at ambient temperature
 7.0-grams Emulsion of Experiment No. 6 at ambient temperature From the above Composition of Mix with Aggregate of Experiment No. 1, the following Mix Procedure Data with BCA No. 10 was obtained:
1) Time to Coat=about 20-seconds
2) % Coating=100%
3) Time to Set=about 2-minutes
4) Wash Off %=0% at about 6-minutes
5) C/O=Mixed for 90-seconds in place of 5-minutes The above emulsion of Example No. 6 and the BCA No. 10 were made and sent to an independent laboratory for mixing with a typical hot mix aggregate gradation. The result of this work is given below.

Typical Hot Mix Surface Gradation Aggregate Results of Example No. 6 and BCA No. 10
Procedure for Emulsion and BCA—
1) In Hobart W-50 mixing bowl add aggregate, pre-wet water (if any) and BCA and mix for 2-minutes.
2) Add emulsion and mix for 2-minutes
3) Remove from mixer and immediately compact by Marshal compactor at 50 vlows per side per SATM-1559
4) Repeat for total of three samples per mix
5) Test according to ASTM-1559

The hot mix samples were received from production run and therefore pre-mixed. Hot mix samples were prepared according to ASTM-1559 for testing. The emulsion mixes were tested according to cold mix procedures at room temperature.

| Sample | BCA | Mix Water | % Emulsion | Cure Time | Test Temp | Pounds | Flow |
|---|---|---|---|---|---|---|---|
| 1 | HOT | MIX | SAMPLE | 24-2 hrs* | 140° F. | 2016 | 18 |
| 2 | 1 | 0 | 7 | 24 hrs | 77° F. | 1941 | 17 |
| 3 | 5 | 0 | 8 | 24 hrs | 77° F. | 1175 | CNB** |
| 8 | 1 | 1 | 7 | 24 hrs | 77° F. | 2757 | 19 |
| 10 | 1 | 0 | 7 | 24 hrs | 77° F. | 1836 | 21 |

*24-2 Hrs is 24 hour cure at 77° F. then heated to 140° F. for 2 hours for testing per hot mix procedure
**CNB = Compressed but Never Broke The emulsion results are surprisingly similar to hot mix wherein the same gradation and aggregate source was the same. The results of the non-limiting example above are both surprising and illustrative of the new art taught herein.

From the aggregate mix example above, it is now within the abilities for one of average skill in the art to reasonably expect to add adjuvant materials to the mix in order to promote or direct the aggregate plus emulsion mix toward a desired end product. Such adjuvant non-limiting material examples would be adhesive promoting agents or asphalt modification moieties such as various latex polymers, such as but not limited to, styrene, vinyl or diene types or ethylene, propylene and the like or acetate moieties, polyvinyl alcohols and the like, various silicone compounds, resins, water thickening chemicals that may be both organic and/or inorganic, salts, buffer systems and the like or other chemical moieties or compounds or mixtures. These non-limiting adjuvant materials may be added into the overall system by treatment of the aggregate or emulsion or separate addition to the mix of aggregate and emulsion. The use of such adjuvant materials is well documented in literature and prior art. Their incorporation into the present new art taught herein is anticipated, expected and included herein by reference cited.

By use of the break control agent, a new method of introduction of various adjuvant materials, such as but not limited to those described above, is now possible. Surprisingly useful results may be obtained by incorporation of adjutants into the BCA. To illustrate this utility, two types of wax found suitable for asphalt or bitumen construction purposes were tested. The two types of wax were from Sasol, Johannesburg, South Africa, and known commercially as Sasol Wax® and/or Sasobit®. Such and similar products have been well documented in the literature for their benefits to paving applications.

BCA No. 11—Utility of BCA with Sasobit Wax common to Asphalt Hot Mix Industry
3.00% BCA Chemical Blend to 100% by weight:
 99.00% Amido Amine of Crude Tall Oil Base JLB 464 Used to Melt Sasobit Wax
 5.00% Sasobit Wax, Sasobit America, now included herein by reference
 1.00% DC-200
 2.00% HCl, 20° Be
 pH=2.0—approximate
 Water to balance formula to 100% by weight
Composition of Mix with Aggregate of Experiment No. 1—BCA No. 11
100.0-grams Aggregate of Experiment No. 1
1.0-grams BCA No. 11
7.0-grams Emulsion of Experiment No. 6

From the above Composition of Mix with Aggregate of Experiment No. 1, the following Mix Procedure Data with BCA No. 11 was obtained:
1) Time to Coat=about 30-seconds
2) % Coating=100%
3) Time to Set=about 2.5-minutes
4) Wash Off %=20% at about 6-minutes; Wash Off %=0% at about 15-minutes
5) C/O=Mixed for 90-seconds in place of 5-minutes. At 6-minutes the areas on rock not coated by BCA No. 11 washed off. Those areas that did coat rock did not wash off.

In another example of the versatility and utility of the BCA of the invention, a BCA was made with another commercially available wax from Sasolwax® known as A28. The use of A-28 teaches the art of adding various components to said BCA that aid in adjusting the properties of the final Composition of Mix properties. Sasolwax A-28® is a non-limiting example teaching utility of functional groups from various chemical moieties other than amines or those attributed to de-foam or wetting chemicals used in the BCA. Sasolwax A28® is known to contain carboxyl groups and therefore an acid value of about 28-mgKOH/g and a drop melting point of 110° C. Sasolwax A28® (also known as A-28) per Sasol literature is now included herein by reference. By this example and teachings of Example No. 6 with the non-limiting BCA No. 11 above and BCA No. 12 below, it is understood that a wide variety of chemical moieties may be included and/or combined to affect the properties of the Mix Procedure Data and therefore the end product. Non-limiting examples of other various chemical moieties would be various polymeric materials that may or may not be water or oil soluble, chemicals containing hydroxyl groups, metal end groups or various metals dissolved or otherwise incorporated into the BCA.

BCA No. 12—Utility of BCA with Sasolwax® A28 to Common Sasobit® of Hot Mix Industry
3.00% BCA Chemical Blend to 100% by weight:
99.00% Amido Amine of Crude Tall Oil Base JLB 464 Used to Melt Sasobit Wax
5.00% A28 Sasolwax®, Sasobit America, now included herein by reference
1.00% DC-200
2.00% HCl, 20° Be
pH=2.0—approximate
Water to balance formula to 100% by weight
Composition of Mix with Aggregate of Experiment No. 1—BCA No. 12
100.0-grams Aggregate of Experiment No. 1
1.0-grams BCA No. 12
7.0-grams Emulsion of Experiment No. 6

From the above Composition of Mix with Aggregate of Experiment No. 1, the following Mix Procedure Data with BCA No. 12 was obtained:
1) Time to Coat=about 60-seconds
2) % Coating=100%
3) Time to Set=about 4-minutes
4) Wash Off %=0% at about 12-minutes
5) C/O=Mixed for 120-seconds in place of 5-minutes. A little slower to coat and break. Seemed stickier and a little faster to wash off than Sasobit® wax of BCA No. 11 . . . bottom line=they are similar but A28 was stickier.

The Use of Clay Emulsions

The use of clay emulsions in making various asphalts, bituminous or other oil type emulsions can be seen, for example, in U.S. Pat. No. 2,620,312 by Manzer, among the many examples of clay emulsion applied to asphalt paving. Another example of clay emulsions is taught by Walker, et al. wherein the clay is amine treated and used with sulfonated thermoplastic polymers. Clays have had a long history in the art of making various emulsions and mastics wherein solvents and asphalt or bitumen are combined with various polymers and ground tires and the like. Until now, no art existed wherein the clay emulsion was used for paving applications in such a manner as to create a quick break and not wash off the aggregate, with optional break control agents as described herein.

Example No. 7—Preferred Embodiment of Clay Emulsion with Two BCAs

Water soluble organic acids are known to be useful in making clay emulsions. The article "Clay Stabilized Asphalt Emulsions" by Dr. A. James of Akzo Nobel expounds on the ability of bentonite clay to form asphalt emulsions. Bialek, in U.S. Pat. No. 4,302,326, included herein by reference, applied art disclosing the use of "Polyox" (trade name for a 100,000 to 7,000,000 molecular weight) a polyethylene resin to break (a break control agent, as it were) clay stabilized asphalt emulsions for separation purposes. The purpose of Bialek's work was to separate oils or asphalts from the water in clay stabilized emulsions. These technologies and others illustrate the desire of various artisans of clay emulsions to control the breaking or coalescence of clay stabilized emulsions.

To further explain and illustrate the new art contained herein, the following examples will make clear the advancement in utilization of clay emulsions.

Experiment No. 7—Composition of Emulsion:
40.00% Asphalt or Bitumen composed of 99.50% PG58-28+0.50% AS-101
4.00% Thermogel Clay
0.40% Tartaric Acid, food grade
pH=As Is
Water to balance formula to 100% by weight A series of mixes with a new limestone aggregate were made and compared.
Composition of Mix with Aggregate, Mix No. 7-1 with Aggregate and Emulsion at Ambient Temperature:
100.0-grams Aggregate ⅜-inch, Limestone from New Source
8.0-grams Emulsion of Experiment No. 7

From the above Composition of Mix with a new Limestone Aggregate, the following Mix Procedure Data was obtained:
1) Time to Coat=about 30-seconds
2) % Coating=100%/0
3) Wash Off %=50% at about 2-minutes
Wash Off %=35% at about 3-minutes
Wash Off %=15% at about 5-minutes and mixing stopped
Wash Off %=3% at about 15-minutes Composition of Mix with Aggregate, Mix No. 7-3 with Aggregate and Emulsion at Ambient Temperature
100.0-grams Aggregate ⅜-inch, Limestone from New Source
8.0-grams Emulsion of Experiment No. 7
0.5-grams BCA=4.00% D-25LR (Arizona Chemical)+1.00% NaOH@50%,
pH=As Is From the above Composition of Mix with a new Limestone Aggregate, the following Mix Procedure Data with BCA as described in Mix No. 7-3 was obtained:

1) Time to Coat=about 30-seconds
2) % Coating=100%
3) Wash Off %=90° % at about 2-minutes
   Wash Off %=20% at about 5-minutes and mixing stopped
   Wash Off %=1% at about 20-minutes
Composition of Mix with Aggregate, Mix No. 7-4 with Aggregate and Emulsion at Ambient Temperature
100.0-grams Aggregate ⅜-inch, Limestone from New Source
   8.0-grams Emulsion of Experiment No. 7
   0.5-grams BCA=4.00% AS-101 Mod+20° Be HCl to pH=2.04

From the above Composition of Mix with the new Limestone Aggregate, the following Mix Procedure Data with BCA as described in Mix No. 7-4 was obtained:
1) Time to Coat=about 30-seconds
2) % Coating=100%
3) Wash Off %=35% at about 2-minutes
   Wash Off %=15% at about 5-minutes and mixing stopped
   Wash Off %=2% at about 20-minutes
Composition of Mix with Aggregate, Mix No. 7-5 with Aggregate and Emulsion at 140° F.
100.0-grams Aggregate ⅜-inch, Limestone from New Source
   8.0-grams Emulsion of Experiment No. 7

From the above Composition of Mix with a new Limestone Aggregate, the following Mix Procedure Data was obtained:
1) Time to Coat=about 30-seconds
2) % Coating=100%
3) Wash Off %=50% at about 2-minutes
   Wash Off %=2% at about 5-minutes and mixing stopped
   Wash Off %=0% at about 25-minutes From the above Composition of Mix data, the following observations may be compared:

The major difference between Mix No. 7-1 and Mix No. 7-5 is the aggregate plus emulsion mix temperatures at ambient and 140° F., respectively. With the mixing temperature being of little influence to the Wash Off % at 3% for mix No. 7-1 at ambient temperature versus 0% Wash Off for Mix No. 7-5 at 140° F. at the 25-minute mark is similar in value for a 63° F. temperature difference between the two mixes;

When examining the data for Mix No. 7-3, utilizing a tall oil plus sodium hydroxide BCA (a "caustic" BCA) versus Mix No. 7 wherein an amine plus hydrochloric acid (an "acid" BCA) the Wash Off %'s may be influenced at various points in time. This is most clearly illustrated at the 2-minute Wash Off % of 90% for Mix No. 7-3 versus 35% for Mix No. 7-4, respectively;

In comparing Mix No. 7-4 at ambient temperature to Mix No. 7-5 at 140° F., with respect to Wash Off %, it is observed that at 2-minutes, Mix No. 7-4 is lower at 15% versus 50%, respectively;

The observations of Mix No. 7-4 versus Mix No. 7-5 with respect to Mix No. 7-1 and Mix No. 7-3 illustrates the ability of the new art taught herein of the utility of a break control agent to influence properties of the aggregate plus emulsion mix. The ability to control various parameters of an aggregate plus emulsion mix allows the technologist of average skill in the art heretofore unexpected and previously unavailable abilities in directing performance of said aggregate plus emulsion mixes to match needs and conditions in application.

Experiment No. 8—Composition of Emulsion:
50.00% Asphalt or Bitumen composed of, 99.50% PG58-28 (138 pen)+0.50% AS-500
3.00% Thermogel Clay
pH=As Is
Water to balance formula to 100% by weight A series of mixes with a new limestone aggregate as used in Experiment No. 8 were made and compared.
Composition of Mix with Aggregate, Mix No. 8-1 with Aggregate and Emulsion at Ambient Temperature
100.0-grams Aggregate ⅜-inch, Limestone from New Source
   1.0-grams BCA=8.0% AS-500+HCl@20° Be+Water to pH=2.0 to 2.5
   15.0-grams Emulsion of Experiment No. 8

From the above Composition of Mix No. 8-1 with a new Limestone Aggregate, the following Mix Procedure Data was obtained:
1) Time to Coat=about 20-seconds
2) % Coating=100%
3) Wash Off %=20% at about 1-minute
   Wash Off %=15% to 20% at about 2-minutes with Adhesion
   Wash Off %=5% to 10% at about 3-minutes with Adhesion
   Wash Off %=~10% at about 5-minutes, at end of mixing, with Adhesion
Composition of Mix with Aggregate, Mix No. 8-2 with Aggregate and Emulsion at Ambient Temperature
100.0-grams Aggregate ⅜-inch, Limestone from New Source
   8.0-grams Emulsion of Experiment No. 8

From the above Composition of Mix No. 8-2 with a new Limestone Aggregate, the following Mix Procedure Data was obtained:
1) Time to Coat=about 20-seconds
2) % Coating=100%/0
3) Wash Off %=20% at about 1-minute with Adhesion
   Wash Off %=15% to 20% at about 2-minutes with Adhesion
   Wash Off %=15% to 10% at about 3-minutes with Adhesion
   Wash Off %=15% to 10% at about 4-minutes with Adhesion
   Wash Off %=<~10% at about 5-minutes, at end of mixing, with Adhesion Mix No. 8-1 and Mix No. 8-2 both indicate adhesion with or without a BCA when the asphalt is modified with AS-500. These two mixes will be compared to Experiment No. 9 below wherein the asphalt modification with AS-500 is absent.

Experiment No. 9—Composition of Emulsion:
50.00% Asphalt or Bitumen, PG 58-28 (138 pen), the same as in Experiment No. 8
3.00% Thermogel Clay
pH=As Is
Water to balance formula to 100% by weight A series of mixes with a new limestone aggregate as used in Experiment No. 8 were made and compared.
Composition of Mix with Aggregate, Mix No. 9-1 with Aggregate and Emulsion at Ambient Temperature
100.0-grams Aggregate ⅜-inch, Limestone from New Source
   15.0-grams Emulsion of Experiment No. 9

From the above Composition of Mix No. 9-1 with a new Limestone Aggregate, the following Mix Procedure Data was obtained:

1) Time to Coat=80% in about 10-seconds
2) % Coating=80%
3) Wash Off %=0% at about 1-minute, therefore still 80% coated
   Wash Off %=0% at about 5-minutes, therefore still about 80% to 85% coated In comparing Mix No. 8-1 and Mix No. 8-2 with Mix No. 9-1, the influence of asphalt modification is illustrated. Mix Nos. 8-1 and 8-2 contain an emulsion with the AS-500 modification to the asphalt before emulsification while there is no such modification to the emulsion used in Mix No. 9-1. Mix No. 8-1 and 8-2 coated 100% and did not loosen the coating during the 5-minute continuous mixing period. Mix No. 9-1 did not coat to 100% during the 5-minute mix period, which is an undesirable trait. By Mix No. 9-1 coating to a maximum of about 80% within the first 10 seconds and not changing throughout the 5-minute mix period, the emulsion formulation of Experiment No. 9 is too fast to break when used with the test aggregate.

It is sometimes desirable to coat an aggregate and not have it cure for a set period of time. Such desirability may be due to location, haul distance, and desire to have components mix and stay easy to handle in stock piles and the like or a multitude of other reasons. The experiments set forth below illustrate the utility of the new art for such a desirable situation.

Experiment No. 10—Composition of Emulsion:
40.00% Asphalt or Bitumen composed of, 99.50% PG58-28+0.50% D-25LR
6.00% Thermogel Clay
0.10% Tartaric Acid
pH=As Is
Water to balance formula to 100% by weight
A series of mixes with a new limestone aggregate as used in Experiment No. 10 were made and compared.
   Composition of Mix with Aggregate, Mix No. 10-1 with Aggregate and Emulsion at Ambient Temperature
   100.0-grams Aggregate ⅜-inch, Limestone from New Source
   8.0-grams Emulsion of Experiment No. 10

From the above Composition of Mix No. 10-1 with a new Limestone Aggregate, the following Mix Procedure Data was obtained:
1) Time to Coat=about 5-seconds
2) % Coating=100% at about 5-seconds and about 70% through 5-minute mix period
3) Wash Off %=40% Retained of 70%=72% at about 2-minutes
   Wash Off %=45% Retained of 70%=69% at about 5-minutes
   Wash Off %=50% Retained of 70%=65% at about 10-minutes
   Wash Off %=65% Retained of 70%=54% at about 15-minutes
   Wash Off %=70% Retained of 70%=51% at about 20-minutes
   Wash Off %=95% Retained of 70%=33% at about 25-minutes
   Wash Off %=95% Retained of 70%=33% at about 30-minutes Composition of Mix with Aggregate, Mix No. 10-2 with Aggregate and Emulsion at Ambient Temperature
   100.0-grams Aggregate ⅜-inch, Limestone from New Source
   1.0-grams BCA=10.0% D-25LR+NaOH@50%+Water to pH=11.9
   8.0-grams Emulsion of Experiment No. 10

From the above Composition of Mix No. 10-2 with a new Limestone Aggregate, the following Mix Procedure Data was obtained:
1) Time to Coat=about 5-seconds
2) % Coating=100% at about 5-seconds and about 70% through 5-minute mix period
3) Wash Off %=20% Retained of 70%=86% at about 2-minutes
   Wash Off %=20% Retained of 70%=86% at about 5-minutes
   Wash Off %=20% Retained of 70%=86% at about 10-minutes
   Wash Off %=30% Retained of 70%=54% at about 15-minutes
   Wash Off %=30% Retained of 70%=54% at about 20-minutes
   Wash Off %=30% Retained of 70%=54% at about 25-minutes
   Wash Off %=40% Retained of 70%=33% at about 30-minutes Experiment No. 11—Composition of Emulsion:
40.00% Asphalt or Bitumen composed of 99.50% PG58-28+0.50% AS-101 Mod
6.00% Thermogel Clay
0.10% Tartaric Acid
pH=As Is
Water to balance formula to 100% by weight
A series of mixes with a new limestone aggregate as used in Experiment No. 11 were made and compared.
   Composition of Mix with Aggregate, Mix No. 11-1 with Aggregate and Emulsion at Ambient Temperature
   100.0-grams Aggregate ⅜-inch, Limestone from New Source
   8.0-grams Emulsion of Experiment No. 11

From the above Composition of Mix No. 11-1 with a new Limestone Aggregate, the following Mix Procedure Data was obtained:
1) Time to Coat=about 5-seconds
2) % Coating=100%/0 at about 5-seconds and at 100% through 5-minute mix period
3) Wash Off %=50% Retained of 100%=50% at about 2-minutes
   Wash Off %=60% Retained of 100%=60% at about 5-minutes
   Wash Off %=60% Retained of 100%=60% at about 10-minutes
   Wash Off %=80% Retained of 100%=80% at about 15-minutes
   Wash Off %=95% Retained of 100%=95% at about 20-minutes
   Wash Off %=100% Retained of 100%=100% at about 25-minutes
   Wash Off %=100% Retained of 100%=100% at about 30-minutes The effect of a break control agent may be seen when comparing Mix No. 11-1 above and having no BCA against Mix No. 11-2 below and having a caustic BCA. In these two mixes, the Wash Off % is different. The Wash Off % at 5-minutes, end of mixing for Mix No. 11-1 versus Mix No. 11-2 is 60% versus 20%, respectively. This observation still holds true at 25-minute Wash Off % wherein Mix No. 8-1 is 100% versus Mix No. 8-2 at 80%, respectively. If, in the case of a desire to slow the break, set and cure due to conditions as previously noted, a BCA of the art is now taught and now within the skill of one of average skill in the art.

Composition of Mix with Aggregate, Mix No. 11-2 with Aggregate and Emulsion at Ambient Temperature 100.0-grams Aggregate ⅜-inch, Limestone from New Source 1.0-grams BCA=10.0% D-25LR+NaOH@50%+Water to pH=11.9

8.0-grams Emulsion of Experiment No. 11

From the above Composition of Mix No. 11-2 with a new Limestone Aggregate, the following Mix Procedure Data was obtained:

1) Time to Coat=about 5-seconds
2) % Coating=100% at about 5-seconds and 100% through 5-minute mix period
3) Wash Off %=15% Retained of 100%=15% at about 2-minutes Wash Off %=20% Retained of 100%=20% at about 5-minutes Wash Off %=40% Retained of 100%=40% at about 10-minutes Wash Off %=60% Retained of 100%=60% at about 15-minutes Wash Off %=60% Retained of 100%=60% at about 20-minutes Wash Off %=80% Retained of 100%=80% at about 25-minutes Wash Off %=90% Retained of 100%=90% at about 30-minutes It should be noted that neither of these two mixes, Mix No. 11-1 nor Mix No. 11-2, actually cured to have any adhesion until after overnight storage at ambient temperature. It is a practical assumption that the small quantity of sample air-dried overnight. It is also a practical assumption that in larger volume industrial applications wherein the sheer quantity would not allow air to penetrate throughout this larger quantity, the inner portions of the larger quantity would be pliable and still workable. This particular trait of the new art now taught herein would find utility in making large quantities of material in advance of the actual time of need, allow the materials to be stored outside wherein exposure to rain or moisture would heretofore have been detrimental by washing off prior art emulsions and now, as taught by the new art, still find utility in application.

It should also be noted that in the examples of Mix No. 8-1 and Mix No. 8-2 made by use of Emulsion No. 8, the art of having an amine based chemical, typically associated with adhesion, anti-strip and the like, added to the asphalt or bitumen being chemically opposing the caustic BCA of, in particular, Mix No. 8-2, a new art of chemically opposing moieties is now taught. It is now expected and within the purview of the art taught herein that one of average skill in the art would understand these parameters (Wash Off %, adhesion and other parameters) would or could be adjusted by changing the type or amount of the amine in the bitumen or type and amount of the components of the BCA to achieve the desired end result.

Utility of Inverted or "Water-in-Oil" Emulsions

Utility of a water-in-oil emulsion is worthwhile in art of construction. Prior art does not teach the utility of adding chemicals to the water solution. This new art illustrates the unexpected advantages of treating the water portion of a water-in-oil emulsion in coating aggregate for construction applications in conjunction with a break control agent.

Experiment No. 12—Composition of Inverted (water-in-oil) Emulsion:

60.00% Asphalt or Bitumen composed of PG58-28 (138 pen)

4.00% Thermogel Clay 0.10% Citric Acid pH=As Is

Water to balance formula to 100% by weight

A series of mixes with the limestone from new source aggregate as used in Experiment No. 11 were made and compared.

Composition of Mix with Aggregate, Mix No. 12-1 with Aggregate and Emulsion at Ambient Temperature 100.0-grams Aggregate ⅜-inch, Limestone from New Source 8.0-grams Emulsion of Experiment No. 12

From the above Composition of Mix No. 12-1 with the Limestone from New Source Aggregate, the following Mix Procedure Data was obtained:

1) Time to Coat=Emulsion did not coat aggregate

Composition of Mix with Aggregate, Mix No. 12-2 with the Limestone from New Source Aggregate and Emulsion at 140° F.

100.0-grams Aggregate ⅜-inch, Limestone from New Source 8.0-grams Emulsion of Experiment No. 12

From the above Composition of Mix No. 12-2 with the Limestone from New Source Aggregate, the following Mix Procedure Data was obtained:

1) Time to Coat=Emulsion did not coat aggregate

Composition of Mix with Aggregate, Mix No. 12-3 with the Limestone from New Source Aggregate and Emulsion at 160° F. to 180° F.—at or below prior art temperature range 100.0-grams Aggregate ⅜-inch, Limestone from New Source 8.0-grams Emulsion of Experiment No. 12

From the above Composition of Mix No. 12-3 with the Limestone from New Source Aggregate, the following Mix Procedure Data was obtained:

1) Time to Coat=about 1-minute
2) % Coating=100% at about 1-minute, therefore 100% coated
3) Wash Off %=0% at end of 5-minute mix, therefore stayed 100% coated C/O: While the presence of Citric Acid lowered the ability of the emulsion to coat aggregate at lower temperatures than prior art, there remains room for improvement It is noteworthy that in the above three mixes, Mix No. 12-1, Mix No. 12-2 and Mix No. 12-3, the only difference is mixing temperatures. Mix No. 12-1, Mix No. 12-2 and Mix No. 12-3 mix temperatures for both the aggregate and emulsion were ambient, 140° F. and 160° F. to 180° F., respectfully. Only Mix No. 12-3 coated at 160° F. to 180° F. temperature range. This is within the teaching of prior art.

New Art for Water-in-Oil Emulsions—

Experiment No. 13—Composition of Inverted (Water-in-Oil) Emulsion:

60.00% Asphalt or Bitumen composed of 99.50% PG58-28+0.50% AS-101 Mod 4.00% Thermogel Clay 0.10% Tartaric Acid pH=As Is Water to balance formula to 100% by weight Composition of Mix with Aggregate, Mix No. 13-1 with Aggregate and Emulsion at Ambient Temperature 100.0-grams Aggregate ⅜-inch, Limestone from New Source 8.0-grams Emulsion of Experiment No. 13

From the above Composition of Mix No. 13-1 with the Limestone from New Source Aggregate, the following Mix Procedure Data was obtained:
1) Time to Coat=about 1-minute
2) % Coating=0% at about 1-minute, therefore 100% coated
3) Wash Off %=0% at end of 5-minute mix, therefore stayed 100% coated C/O: Tartaric Acid improved ability of Inverted emulsion to coat aggregate at lower temperatures, i.e. Ambient versus 160° F. for Citric Acid.

Comparison of Mix No 12-3 against Mix No. 13-1 reveals that the mix temperature can be lowered from 160° F. to 180° F. range to ambient, respectfully. This is an unexpected result of major benefit in energy cost savings.

Comparison of the Emulsion of Experiment No. 12 to that of Emulsion of Experiment No. 13 reveals the art of oppositely charged chemical moieties. The tartaric acid (an organic acid) of the water phase versus the amine (an organic base) in the asphalt phase of the emulsion, creating an unexpected and beneficial result. In this example, Mix No. 13-1, the tartaric acid is acting as both an adjuvant and a BCA in the aggregate+emulsion mix wherein the BCA is made a part of the emulsion and not a separate addition.

There are many modifications to the asphalt or bitumen known to the art that are applicable to the new art taught herein. These modifications are expected and within the prevue of the art taught herein. Non-limiting examples of some asphalt modifications may be various polymer modifications such as, but not limited to, styrene, butadiene, isoprene, ethylene, propylene, acetates, mineral acids, mineral bases, mineral salts, organic acids, organic bases, or any of these combinations known in the art, modification by use of organic or inorganic chemical moieties and many more too numerous to list.

Of particular interest is the modification of the aggregate plus emulsion plus (optionally) the BCA mix with recycled asphalt pavement ("RAP"), recycled asphalt shingles ("RAS"), other recyclable materials, fibers (as in Experiment No. 1 disclosed herein) being either natural, synthetic or recycled or other adjuvant materials known in the art. These too, along with adjuvant aggregate pre-coat moieties, are to be expected and within the prevue of the art taught herein.

Also expected and within the prevue and as a direct result of the invention taught herein is the ability of one of average skill in the art to understand that emulsion products of the art and aggregates can be mixed in place or rather said to be transported to the construction site and mixed at that location for immediate placement.

It is expected that aggregates may be graded and warmed, for example due to inclement weather, to a more desirable temperature by any suitable means known in the art. One particularly suitable method of warming aggregates, would be by use of an infrared heater such as is commercially available (in this non-limiting example) and made by Ray-Tech Infrared Corporation of Charlestown, N.H., USA. It is now made obvious that one skilled in the art may grade and warm aggregate through an existing hot mix plant for the same end result effect.

There are any numbers of mixing and paving apparatus that would be suitable for placement of product of the art taught herein at service locations. Non-limiting examples of this equipment may be pavers as used by the hot mix industry, as well as machines built to place previous art emulsions into service locations. These machines and their optional modifications are foreseen within the prevue of the art taught herein.

From the art taught herein, it is now made obvious to one of average skill in the art that any type of hydrocarbon oil, that is oils other than asphalt or bitumen, or combinations of hydrocarbon oils, be they of natural or synthetic or refined origin, in combination with asphalt or bitumen, would benefit from this new art. Therefore, such oils and their combinations are within the prevue and foreseen within the art taught herein.

The new art is applicable to any oil and water emulsion for coating recycled asphalt pavement (RAP), recycled asphalt shingles (RAS), ground tire rubber (GTR) and many other useful things.

Whereas, the present invention has been described in relation to the drawings attached hereto, it should be understood that other and further modifications, apart from those shown or suggested herein, may be made within the spirit and scope of this invention.

What is claimed is:

1. An emulsion mixed with aggregates other than slurry seal aggregate gradations for road, pathway, trail or other transport route construction comprising:
   combinations of emulsifiers and water to form an emulsion;
   at least one break control agent selected from the group consisting of anionic or cationic chemical moieties, de-foaming agents, wetting agents, adhesion agents, organic acids, mineral acids, organic adjuvants and mineral base adjuvants;
   said emulsion and said break control agent combined with aggregates of suitable gradation for road, pathway, trail or transport construction wherein said emulsifiers contain phosphorous to form either an oil-in-water or water-in-oil emulsion;
   a hydrocarbon oil containing asphalt or bitumen or other hydrocarbon oils in combination with asphalt; and
   water for emulsification of at least about 25% or more of total emulsion weight;
   wherein said break control agent is combined with said aggregates at ambient temperature before combining with said hydrocarbon oil and said emulsion at ambient temperature.

2. An emulsion as set forth in claim 1 wherein said hydrocarbon oil further contains adjuvants.

3. The emulsion of claim 2 wherein said adjuvants are fibers, hydrocarbon resins, polymers, chemical moieties containing nitrogen, carboxylic or hydroxyl groups or vinyl carbon-carbon bonds, recycled road materials or recycled shingles.

4. The emulsion of claim 1 wherein the phosphorous is phosphate surfactants of various molecular weights containing moieties selected from the group consisting of ethylene, propylene and butylene.

5. The emulsion of claim 1 wherein said at least one break control agent is a cationic chemical moiety.

6. The emulsion as set forth in claim 1 wherein said aggregates further contain adjuvants.

7. The emulsifiers of claim 1 wherein said phosphorous is phosphate surfactants of various molecular weights.

8. The emulsion of claim 1 wherein the anionic or cationic chemical moieties are organic acids or bases characterized by either amines or carboxylic acids or hydroxides or their combinations that act as break control and/or adhesion moieties.

9. The emulsion of claim 1 wherein the anionic or cationic chemical moieties are inorganic mineral acids or bases.

10. A process to prepare an oil-in-water emulsion mixed with aggregates at ambient temperature for construction or industrial applications, which process comprises the steps of:
   selecting a break control agent selected from the group consisting of anionic or cationic chemical moieties, de-foaming agents, wetting agents, adhesion agents, organic acids, mineral acids, organic adjuvants and mineral base adjuvants;
   combining the break control agent with aggregate of suitable gradation at ambient temperature; and
   thereafter mixing the combined break control agent and aggregate with an oil-in-water emulsion containing phosphorous, hydrocarbon oil, and water at ambient temperature.

11. The process as set forth in claim 10 including the additional optional step of pre-wetting the aggregate with water.

12. A process to prepare a water-in-oil emulsion mixed with aggregate at ambient temperature for construction or industrial applications, which process comprises the steps of:
   selecting a break control agent selected from the group consisting of anionic or cationic chemical moieties, de-foaming agents, wetting agents, adhesion agents, organic acids, mineral acids, organic adjuvants and mineral base adjuvants;
   combining the break control agent with aggregate of suitable gradation at ambient temperature; and
   thereafter mixing the combined break control agent and aggregate with a water-in-oil emulsion containing phosphorous, hydrocarbon oil, and water at ambient temperature.

13. The process as set forth in claim 12 including the additional optional step of pre-wetting the aggregate with water.

* * * * *